UNITED STATES PATENT OFFICE.

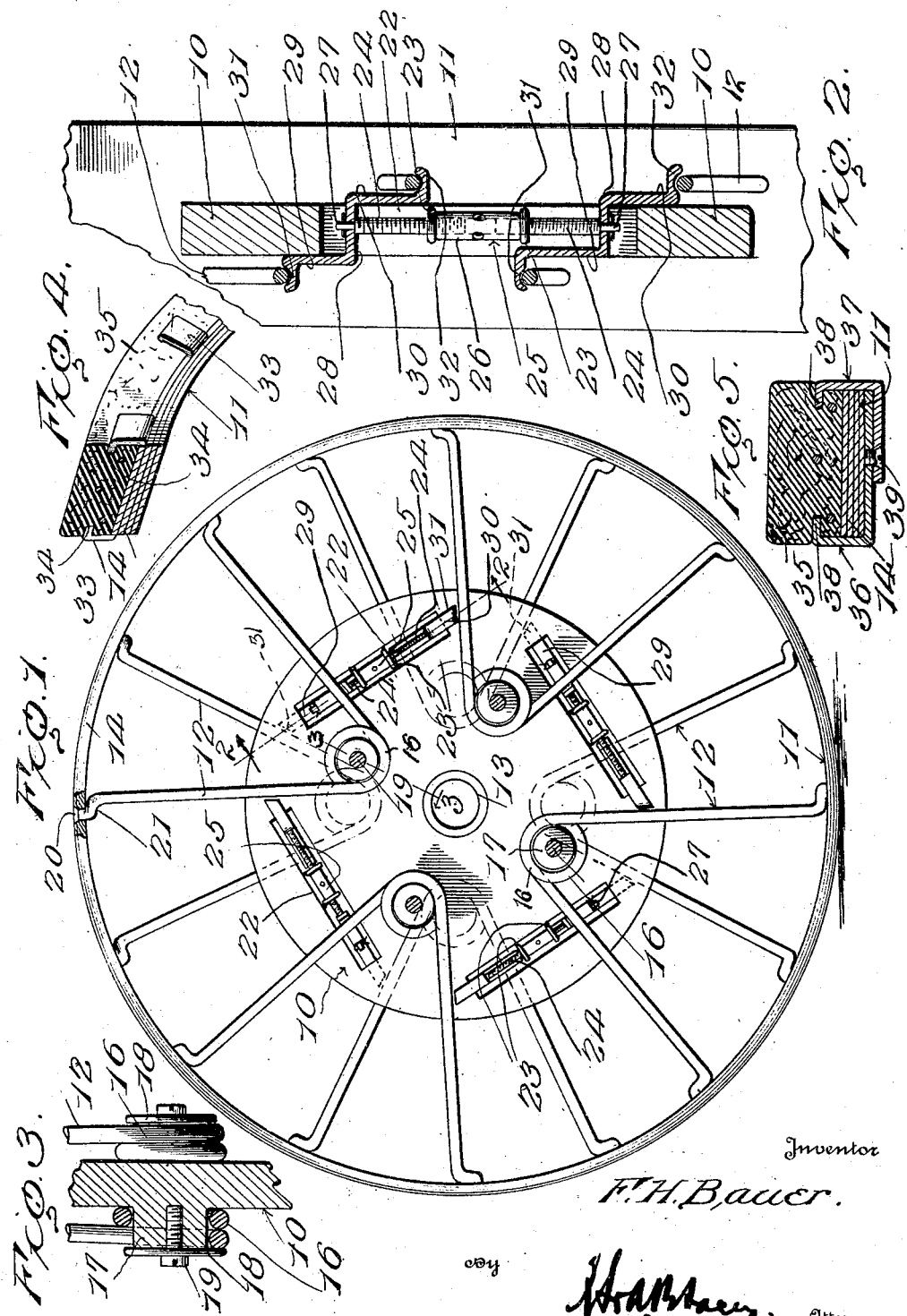

FREDERICK H. BAUER, OF FORT WORTH, TEXAS.

RESILIENT WHEEL.

1,287,184.

Specification of Letters Patent.

Patented Dec. 10, 1918.

Application filed November 13, 1917. Serial No. 201,837.

*To all whom it may concern:*

Be it known that I, FREDERICK H. BAUER, a citizen of the United States, residing at Fort Worth, in the county of Tarrant and State of Texas, have invented certain new and useful Improvements in Resilient Wheels, of which the following is a specification.

My invention relates to new and useful improvements in resilient wheels for vehicles and has for its primary object the provision of a wheel particularly adapted for use over soft or uneven roads to insure proper traction between the road surface and the wheel.

In this connection one of the primary objects of my invention resides in constructing a wheel having a resilient rim or felly portion capable of flattening somewhat at the point of engagement with the road bed due to the pressure exerted upon it by the load imposed upon the hub and transmitted to the felly by the spokes so as to give an enlarged bearing surface between the rim or felly and the road bed.

A still further object of my invention consists in constructing a wheel of this character in which the spokes are also resilient in order to permit this yielding of the rim.

Another object which I have in view is the provision of adjustable means for limiting the amount of distortion of the spokes and consequently the amount of flattening of the wheel.

With these and other objects in view, my invention will be more fully described, illustrated in the accompanying drawings and then specifically pointed out in the claims which form a part of this application.

In the drawings:

Figure 1 is a side elevation partly in section of a wheel constructed in accordance with my invention as it appears when no load is imposed upon it;

Fig. 2 is a fragmentary sectional view taken on the line 2—2 of Fig. 1, looking in the direction of the arrows and illustrating the means employed for checking distortion of the spokes;

Fig. 3 is a fragmentary sectional view taken on the line 3—3 of Fig. 1 illustrating the manner of connecting the resilient spokes to the hub disk of the wheel;

Fig. 4 is a fragmentary perspective view showing a method of attaching a tire to the rim;

Fig. 5 is a fragmentary sectional view showing another method of attaching a tire to the rim.

Corresponding and like parts are referred to in the following description and indicated in all the views of the drawings by the same reference characters.

Broadly speaking my improved wheel includes a hub disk 10, rim or felly 11 and a plurality of resilient spoke elements 12. The hub disk is preferably circular in form and is provided centrally with an axle receiving sleeve 13. The resilient yieldable rim or felly 11 is built up of a plurality of superimposed layers 14 of steel or other suitable resilient material fastened together in any suitable manner. These layers should be of such thickness and number as to afford the desired yielding qualities and still possess the necessary strength. Obviously, each layer may be in the form of an endless ring or band of resilient metal, or a continuous band of such metal may be wound upon itself spirally to produce a rim of the requisite number of layers.

Each spoke element 12 constitutes in effect a pair of spokes, each spoke element being formed from a single length of resilient wire or from a single resilient rod of suitable diameter. The wire or rod, as the case may be, is bent upon itself intermediate its length to provide an eye 16 proportioned to surround a cylindrical boss 17 either secured to or formed integrally with the hub disk 10. Cap plates 18 are secured against the ends of the various bosses by cap screws 19 or equivalent fastening means and project at their peripheries beyond the bosses to overlie the eyes 16 and prevent their lateral displacement. The wire or rods forming the spring elements are extended toward the rim with their side portions diverging from each other, as clearly shown in Fig. 1, and their ends are passed through suitable openings formed in the rim or felly and up set, as indicated at 20 in Fig. 1, to secure them against inward movement through the felly. Each spoke end immediately within the rim or felly is off-set, as indicated at 21, to provide in effect a stop shoulder engaging against the inner face of the rim or felly to prevent outward movement of the spoke end therethrough.

Preferably, as indicated in the drawings, a series of spoke elements is secured to each side of the hub disk and the bosses supporting them are so located upon the hub disk that the outer ends of the spoke elements of one series will be disposed midway between the outer ends of the spoke elements of the other series so that the spacing between the outer ends of all of the spoke elements will be uniform and the strain exerted upon the hub by them will be evenly distributed between the opposite sides of the hub.

The resiliency or yieldability of the rim or felly and of the spokes should be such as to permit any desired amount of flattening of that portion of the rim or felly engaging the ground under normal load conditions imposed upon the wheel so as to insure not only the desired resiliency of the wheel but also an enlarged tractive or bearing surface between the wheel and road bed.

However, in order to avoid undue distortion or flattening of the wheel under exceptional loads, or due to sudden strains exerted upon it when traveling over rough ground, I provide means for checking or limiting the yielding of the resilient spokes as it is obvious that the rim or felly can flatten only to such extent as the spokes permit due to their yielding. Preferably this checking means is adjustable and a simple form of check is clearly illustrated in Figs. 1 and 2. As there shown the hub disk at suitable intervals is formed with slots 22 each disposed with its length at a right angle to the radius of the disk bisecting it. Eye bolts 23 or equivalent devices are secured with their eyes projecting into the slots in spaced relation, two eye bolts being provided for each slot and the threaded rods 24 of a turnbuckle mechanism, indicated as a whole by the numeral 25, are journaled in these eyes and at their adjacent ends engage in the internally threaded nut 26 of the turnbuckle which at its ends engages against the opposed faces of the eyes. The outer ends of the threaded rods 24 have swivel connection, as shown at 27, with slides 28 which extend transversely through the slots and which at their ends are provided with oppositely extending lateral projections 29 and 30 terminating in outwardly directed lips 31 each having one side provided with a seat 32 to be engaged by an adjacent spoke element.

As will be apparent by reference to Figs. 1 and 2 the extending of these arms 29 and 30 in opposite directions so disposes the lips 31 that one lip of each slide will engage a spoke element at one side of the hub disk while the other lip of the same slide will engage a spoke element at the opposite side of the hub disk. By this arrangement only half as many turnbuckle mechanisms as there are spoke elements are required.

Normally when the wheel is under no strain the spoke elements will not engage in the seats but when the wheel has been distorted to the maximum extent intended the spoke elements will engage the seats of the slides and will be held against any further material distortion and will, consequently, hold the wheel rim or felly against further distortion. By embodying turnbuckles in the stops as a means for holding the slides I provide a simple and efficient form of adjustment by which I may readily vary the point at which distortion of the wheel will be checked.

If desired, a solid tread or tire of rubber or equivalent material may be secured about the rim, two methods of securing such a tread being shown in Figs. 4 and 5. In Fig. 4 I show the outer layer of the rim as formed with spaced outwardly extending inwardly directed hooks 33 adapted to engage in suitable seats 34 in a reinforced rubber tire 35, it being understood that these hooks will be sufficiently resilient to permit their being bent into and out of engagement with the tire to permit application of the tire or removal of a worn tire and replacement by a new tire.

In Fig. 5 I have illustrated another method in which U-shaped clamping members 36 and 37 have their intermediate portions engaging the sides of the rim with their shorter arms 38 engaging in seats formed at suitably spaced intervals in the sides of the tire and having their inner arms overlapped against the inner face of the rim and secured by a bolt 39 or other fastening device.

Although I have chiefly suggested the use of thin rings or bands of steel for the rim construction the rim may be constructed in many different ways according to the strength required, wood, fiber, steel wire, leather and the like or various combinations of such materials being suitable under different circumstances.

Obviously, my improved wheel construction is of such a character as to admit of various minor changes in construction and disposal of parts and I, therefore, reserve the right to make any changes which may fall within the scope of the claims.

Having thus described the invention, what is claimed as new is:

1. A resilient wheel including a rim capable of yielding or flattening under a load, a hub provided on its opposite faces with a plurality of circumferentially spaced bosses, and a plurality of spring elements bent upon themselves intermediate their lengths to form eyes engaging about the bosses and having their ends secured to the rim.

2. A resilient wheel including a rim capable of yielding or flattening under a load, a hub provided on its opposite faces with a plurality of circumferentially spaced bosses, a plurality of spring elements bent upon themselves intermediate their lengths to form eyes engaging about the bosses and having their ends secured to the rim, and means for preventing displacement of the eyes from the bosses.

3. A resilient wheel including a rim capable of yielding or flattening under a load, a hub provided on its opposite faces with a plurality of circumferentially spaced bosses, a plurality of spring elements bent upon themselves intermediate their lengths to form eyes engaging about the bosses and having their ends secured to the rim, means for preventing displacement of the eyes from the bosses, the free ends of the spoke elements being passed through the rim and upset, and the spoke elements being bent adjacent the inner face of the rim to provide abutting portions engaging the rim.

4. A resilient wheel including a rim capable of yielding or flattening under a load, a hub provided on its opposite faces with a plurality of circumferentially spaced bosses, a plurality of spring elements bent upon themselves intermediate their lengths to form eyes engaging about the bosses and having their ends secured to the rim, means for preventing displacement of the eyes from the bosses, the free ends of the spoke elements being passed through the rim and upset and the spoke elements being bent adjacent the inner face of the rim to provide abutting portions engaging the rim, the rim being formed of a plurality of superimposed layers of suitable material whereby the layers are secured together by the spokes.

5. A resilient wheel including a hub, a rim, yieldable spoke elements connecting the hub and the rim, and lips projecting from the sides of the hub to be engaged by the spoke elements whereby distortion of said elements will be limited.

6. A resilient wheel including a hub, a rim, yieldable spokes connecting the hub and the rim, and slides mounted in the hub and provided at their ends with seats to be engaged by the spokes.

In testimony whereof I affix my signature.

FREDERICK H. BAUER. [L. S.]

Copies of this patent may be obtained for five cents each, by addressing the "Commissioner of Patents, Washington, D. C."